United States Patent
Kawakami

(10) Patent No.: US 7,224,894 B2
(45) Date of Patent: May 29, 2007

(54) LIGHTING APPARATUS, ELECTRONIC FLASH APPARATUS AND CAMERA

(75) Inventor: Chikuni Kawakami, Asaka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/227,256

(22) Filed: Sep. 16, 2005

(65) Prior Publication Data

US 2006/0008266 A1    Jan. 12, 2006

Related U.S. Application Data

(62) Division of application No. 10/759,421, filed on Jan. 20, 2004.

(30) Foreign Application Priority Data

Jan. 21, 2003 (JP) ............................. 2003-011751
Jan. 21, 2003 (JP) ............................. 2003-011752

(51) Int. Cl.
   G03B 15/05   (2006.01)
   H04N 5/222   (2006.01)

(52) U.S. Cl. ................. 396/175; 396/200; 348/371

(58) Field of Classification Search ................ 396/175, 396/176, 200, 61, 62, 182; 348/370, 371
   See application file for complete search history.

(56) References Cited

U.S. PATENT DOCUMENTS 5,895,128 A * 4/1999 Kishimoto et al. ........... 396/61
6,161,910 A * 12/2000 Reisenauer et al. ......... 315/309
6,598,986 B2 * 7/2003 Yano ............................ 362/18
2002/0025157 A1  2/2002 Kawakami

FOREIGN PATENT DOCUMENTS

| JP | 59-73728 U | 5/1984 |
|---|---|---|
| JP | 64-48053 A | 2/1989 |
| JP | 9-138449 A | 5/1997 |
| JP | 11-133490 A | 5/1999 |
| JP | 11-174534 A | 7/1999 |
| JP | 2000-2911 A | 1/2000 |
| JP | 2000-35608 A | 2/2000 |
| JP | 2000-221570 A | 8/2000 |
| JP | 2002-43630 A | 2/2002 |
| JP | 2002-116481 A | 4/2002 |

* cited by examiner

Primary Examiner—W. B. Perkey
Assistant Examiner—Rishi Suthar
(74) Attorney, Agent, or Firm—Birch, Stewart, Kolasch & Birch, LLP

(57) ABSTRACT

A lighting apparatus includes: a reflecting surface for reflecting light, formed on a circuit board;—an LED light source for emitting illumination light with a light-emitting diode, mounted on a part of the reflecting surface; and a reflector for reflecting ahead the light emitted from the LED light source, mounted on the circuit board so as to surround the LED light source and have the opened rear thereof closed by the reflecting surface.

14 Claims, 9 Drawing Sheets

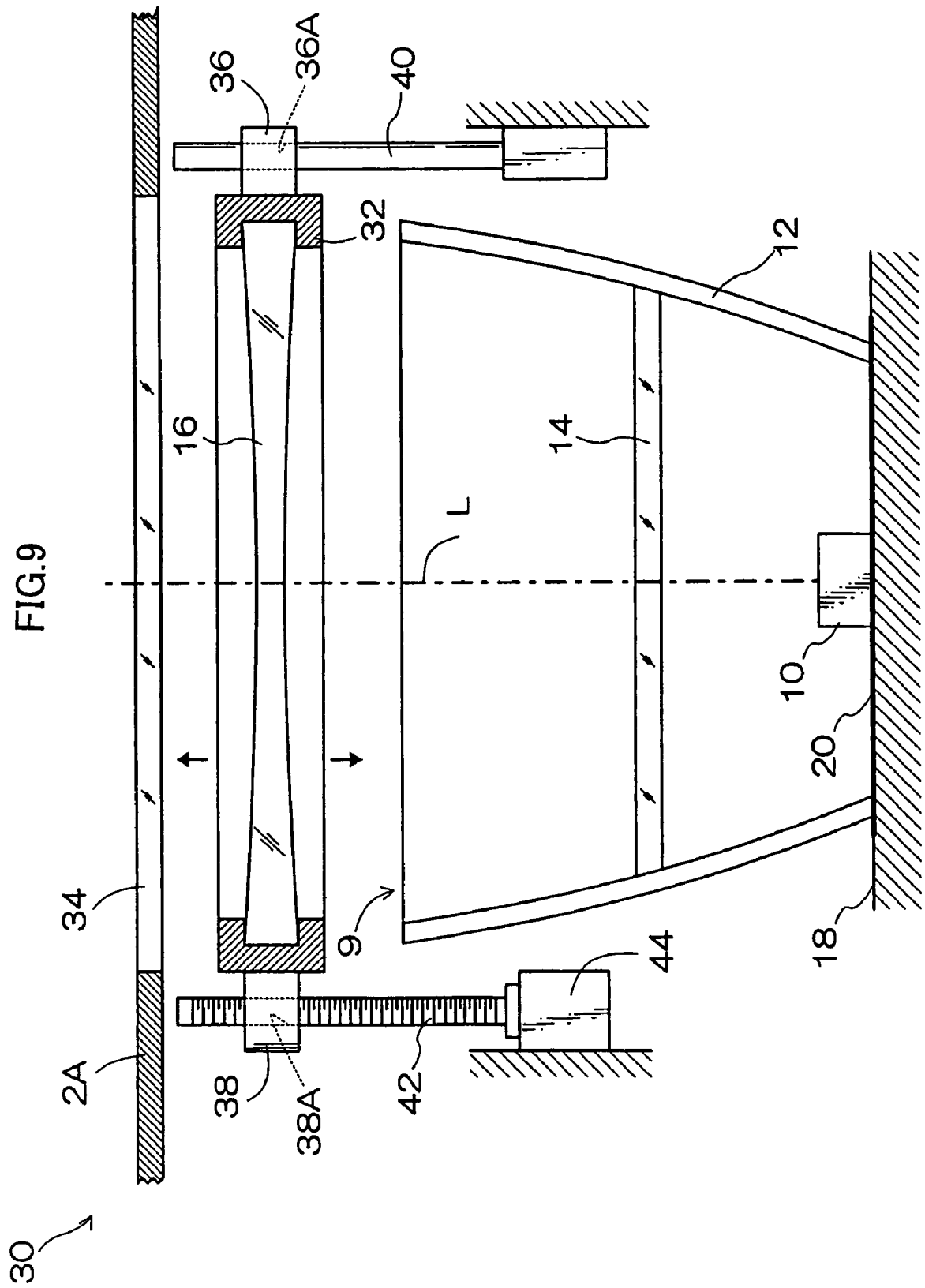

LIGHTING APPARATUS, ELECTRONIC FLASH APPARATUS AND CAMERA

CROSS REFERENCE TO RELATED APPLICATIONS

This application is a Divisional of co-pending application Ser. No. 10/759,421, filed on Jan. 20, 2004, the entire contents of which are hereby incorporated by reference and for which priority is claimed under 35 U.S.C. § 120; and this application claims priority of Application Nos. 2003-011751 and 2003-011752 filed in Japan on Jan. 21, 2003.

BACKGROUND OF THE INVENTION

1. Field of the Invention

The present invention relates to a lighting apparatus, an electronic flash apparatus and a camera, and in particular, to the lighting apparatus, electronic flash apparatus and camera using a light-emitting diode (LED) as a light source.

2. Description of the Related Art

In general, an electronic flash apparatus of a camera is using a xenon tube as a light source. However, the electronic flash apparatus using the xenon tube as the light source has a drawback that strobing with a slow shutter is not possible because it can only emit instantaneous light of a few milliseconds or so. It also has a drawback that, as the xenon tube has a spectral characteristic close to daylight color, a photo of unnatural tone is made if strobing for the sake of back light correction is performed in the morning or in the evening.

Thus, the electronic flash apparatus using an LED as the light source is proposed in order to resolve the drawbacks of the electronic flash apparatus using the xenon tube as the light source (refer to Japanese Patent Application Publication No. 2002-116481 for instance).

SUMMARY OF THE INVENTION

As a light source of an electronic flash apparatus is required to emit high-intensity light, it is desirable, in the case of using an LED, to efficiently use the light emitted from the LED.

However, when considering the cases of implementing a chip (type) LED, an LED lamp and so forth on a circuit board having a strobing circuit or the like implemented thereon for the reason of allowing machine implementation and reducing manufacturing cost, there is a problem that the light emitted from the LED to the rear side is irradiated on the circuit board and attenuated and is not effectively used as illumination light.

As the LED is a point source, there is also a problem that its light-emitting area is smaller than that of the electronic flash apparatus of a xenon tube and can only emit the light in a narrow range.

The present invention has been implemented in consideration of such circumstances, and an object thereof is to provide a lighting apparatus, an electronic flash apparatus and a camera capable of effectively using as the illumination light the light from the LED used as a light source and irradiating the light in a wide range.

In order to attain the above described object, the first aspect of the present invention provides a lightning apparatus comprising a reflecting surface for reflecting the light, formed on a circuit board, an LED light source for emitting illumination light with a light-emitting diode, mounted on a part of the above described reflecting surface, and a reflector for reflecting ahead the light emitted from the above described LED light source, mounted on the above described circuit board so as to surround the above described LED light source and have the opened rear thereof closed by the above described reflecting surface.

According to the invention, the light emitted from the LED light source in the rear direction is reflected ahead by the reflecting surface of the circuit board and is effectively used as the illumination light.

Preferably, the above described reflecting surface is formed by gold-plating.

Preferably, the above described LED light source is a surface-mounted white light-emitting chip LED and is surface-mounted on the above described reflecting surface. Machine implementation of the LED light source on the circuit board is thereby possible so as to reduce manufacturing cost.

Preferably, the above described LED light source is comprised of three types of LED light sources for emitting red light, green light and blue light, and the LED light source for emitting the light in each color is radially placed. To be more specific, white light-emitting is enabled by mixing the three colors of red, green and blue, and it becomes easier to mix them by radially placing them.

Preferably, an optical component for expanding and flooding ahead the light emitted from the above described LED light source is placed on the above described reflector. It is thereby possible to use the light from the above described LED light source which is strongly oriented as the illumination light for illuminating a wide range.

The second aspect of the present invention provides a lightning apparatus having an LED light source for emitting the illumination light with a light-emitting diode, and the reflector for reflecting ahead the light emitted from the above described LED light source, the above described reflector placed so as to surround the rear side and side surface side of the above described LED light source, and the above described LED light source is placed clear of an internal reflecting surface of the above described reflector.

According to the invention, the rear side of the LED light source is surrounded by the reflector, and the LED light source is placed clear of the internal reflecting surface of the reflector. Therefore, the light emitted to the rear side from the LED light source is reflected ahead by the reflector so that the light emitted from the LED light source will be effectively used as the illumination light.

Preferably, the above described LED light source has a lead terminal, and the above described lead terminal is put through a hole provided on the above described reflector and is joined with a predetermined pad of the circuit board so as to mount the above described LED light source on the above described circuit board. To be more specific, it is possible, by using an LED lamp having the lead terminal as the LED light source, to place the LED light source clear of the internal reflecting surface of the reflector with the lead terminal as a supporting element when joining (electrically connecting) the lead terminal with the predetermined pad of the circuit board. Machine implementation also becomes possible so as to reduce manufacturing cost.

The above-mentioned lighting apparatus is suitable as the electronic flash apparatus of the camera.

The third aspect of the present invention provides an electronic flash apparatus comprising a light-emitting portion having an LED light source for emitting the illumination light with the light-emitting diode, and a reflector for reflecting ahead the light emitted from the LED light source, and a lens for expanding and flooding ahead the light emitted from the light-emitting portion, placed in front of the above described light-emitting portion.

According to the invention, it is possible, by placing the lens for expanding ahead the light in front of the light-emitting portion, to expand and irradiate the light from the light-emitting diode emitted as a point source. Thus, it is possible to illuminate a wide range even in the case of using the light-emitting diode which is the point source and is strongly oriented.

Preferably, an optical element for diffusing the light emitted from the above described LED light source is placed between the above described LED light source and the above described lens.

According to the invention, it is possible to expand the light-emitting area of the light-emitting portion by diffusing the light emitted from the above described LED light source with the optical element.

Preferably, the above described optical element diffuses the light emitted from the above described LED light source and also converts it into predetermined color temperature.

According to the invention, it is possible to adjust the light emitted from the LED light source at the predetermined color temperature with the optical element.

Preferably, the electronic flash apparatus comprises a movement device which relatively moves the above described light-emitting portion and the above described lens in an optical axis direction, and changes an irradiation angle of the light emitted from the above described lens by relatively moving the above described light-emitting portion and the above described lens in the optical axis direction with the movement device.

According to the invention, it is possible to change the irradiation angle of the light emitted from the lens by relatively moving the light-emitting portion and the lens in the optical axis direction with the movement device.

The electronic flash apparatus may be arranged in a camera body to provide a camera.

As described above, according to the present invention, the light emitted in the rear direction from an LED light source is reflected ahead by the reflecting surface of the circuit board having the LED light source mounted thereon or by the internal reflecting surface of the reflector so as to be effectively utilized as the illumination light. It is also possible, by placing the lens for expanding the light in front of the light-emitting portion, to expand and irradiate the light from the light-emitting diode emitted as the point source. Thus, it is possible to shed the light in a wide range even in the case of using the light-emitting diode which is the point source and is strongly oriented.

BRIEF DESCRIPTION OF THE DRAWINGS

FIG. 9 is a longitudinal section of the electronic flash apparatus according to a third embodiment.

DETAILED DESCRIPTION OF THE PREFERRED EMBODIMENTS

Figure 1:
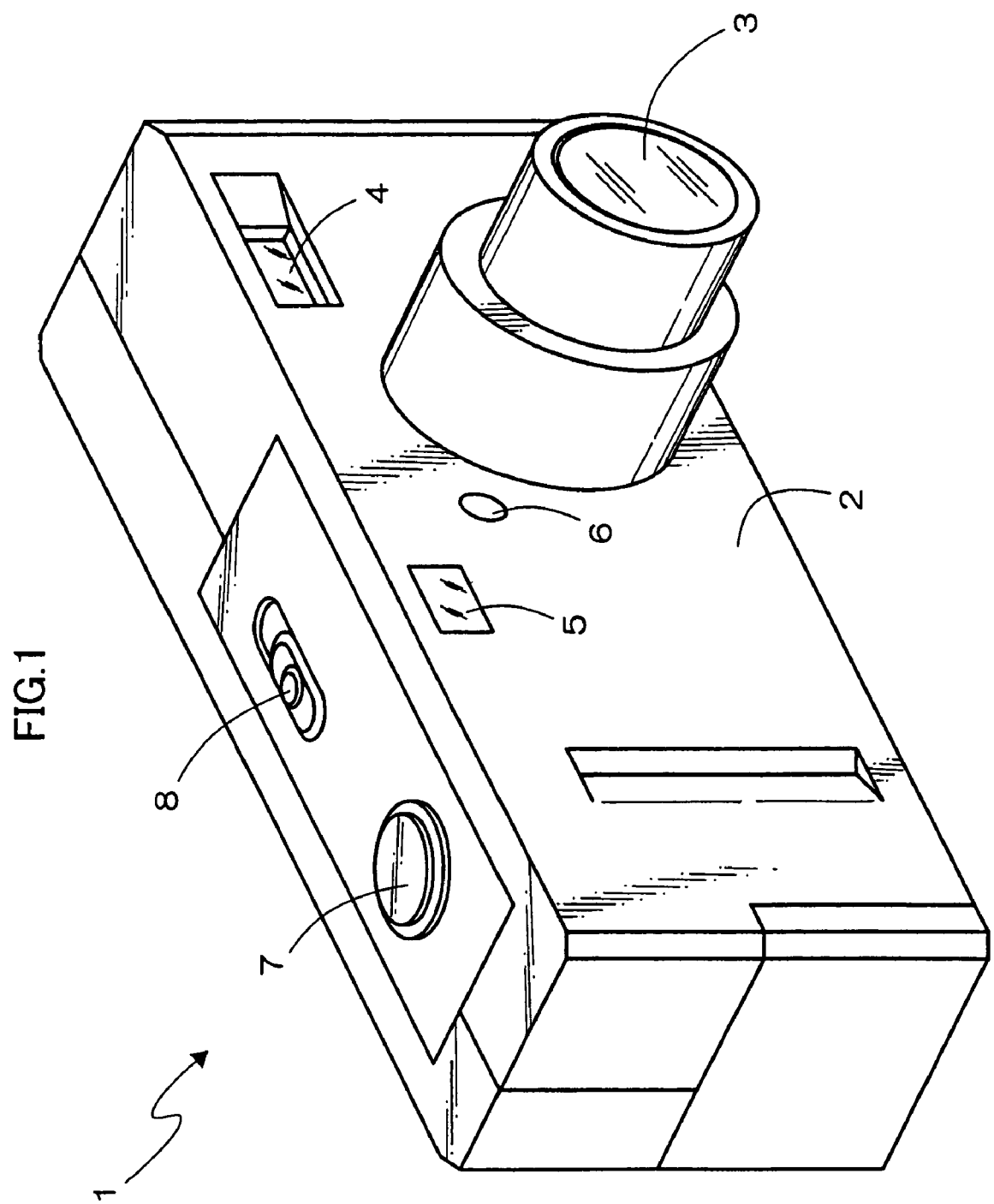
FIG. 1 is a front perspective view showing an embodiment of a camera having an electronic flash apparatus according to the present invention built therein.

Hereafter, preferred embodiments of a lighting apparatus, an electronic flash apparatus and a camera according to the present invention will be described by referring to the drawings.

FIG. 1 is a front perspective view showing an embodiment of a camera having an electronic flash apparatus according to the present invention built therein.

This camera 1 is a digital camera for converting an optical image of a subject into a digital signal by using a CCD and recording it on a recording medium. A taking lens 3, a finder window 4, a electronic flash apparatus 5, a electronic flash dimmer window 6 and so on are provided at the front of a camera body 2 thereof, and a release button 7, a power switch 8 and so on are provided on the top surface. And a finder eye piece, a liquid crystal monitor, various operation buttons and so on are provided on the rear of the camera body 2 although not shown.

Figure 2:
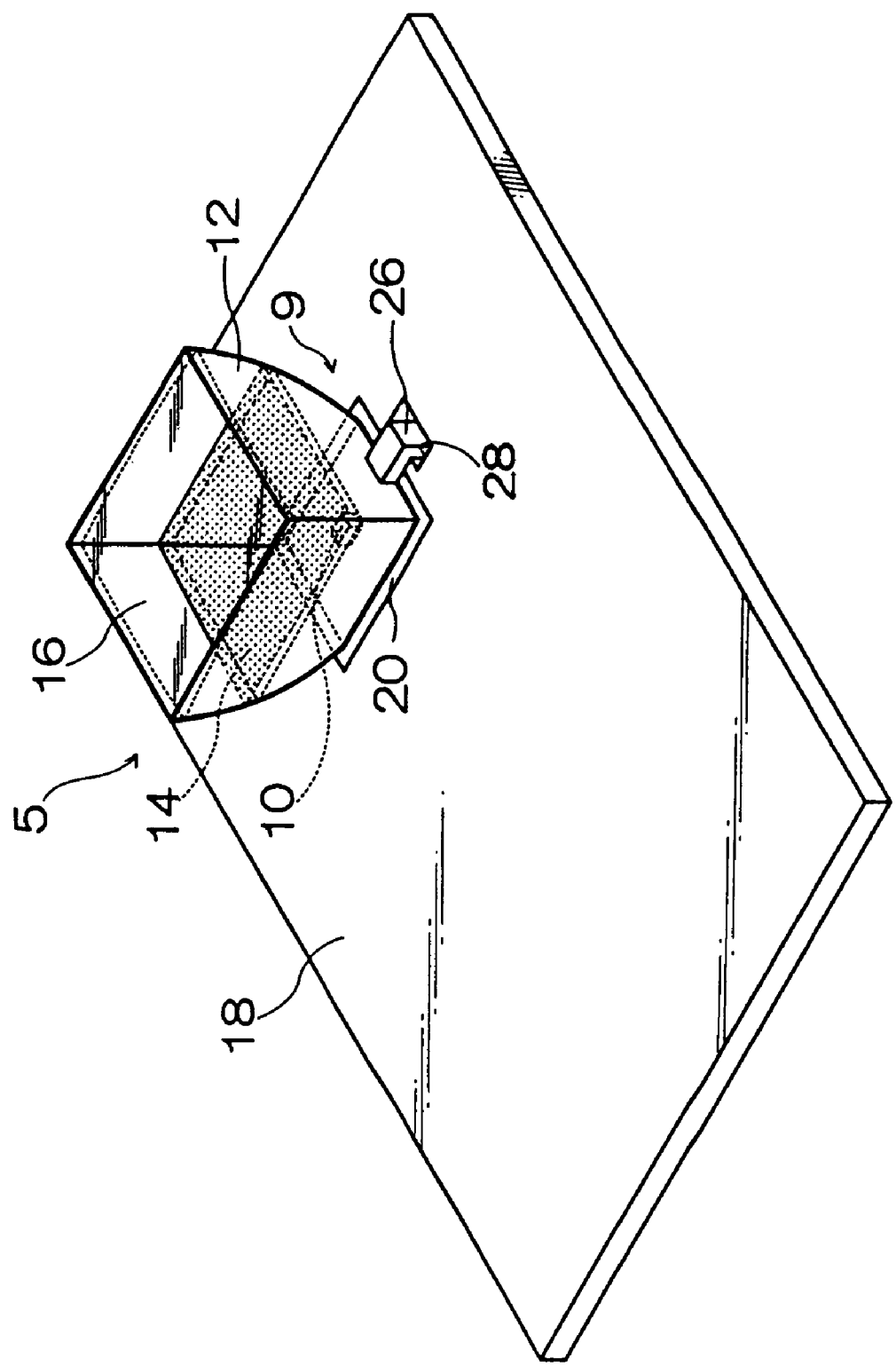
FIG. 2 is a perspective view showing configuration of the electronic flash apparatus according to a first embodiment.

FIG. 2 is a perspective view showing configuration of a first embodiment of the electronic flash apparatus 5 built in the camera body 2 of the camera 1 shown in FIG. 1.

As shown in FIG. 1, the electronic flash apparatus 5 is comprised of a light-emitting portion 9 comprising a chip (type) LED 10, a reflector 12 and a diffusion plate 14 and a concave lens 16 for expanding and flooding ahead the light emitted from the light-emitting portion 9. It is mounted on a circuit board 18 (printed board for instance).

The circuit board 18 has circuit components (a strobing circuit for controlling light emission of the chip LED 10 of the electronic flash apparatus 5 for instance) mounted thereon. The circuit board 18 has a mounting land 20 to which gold plate is affixed provided thereon, and the electronic flash apparatus 5 is mounted on the mounting land 20.

Figure 3:
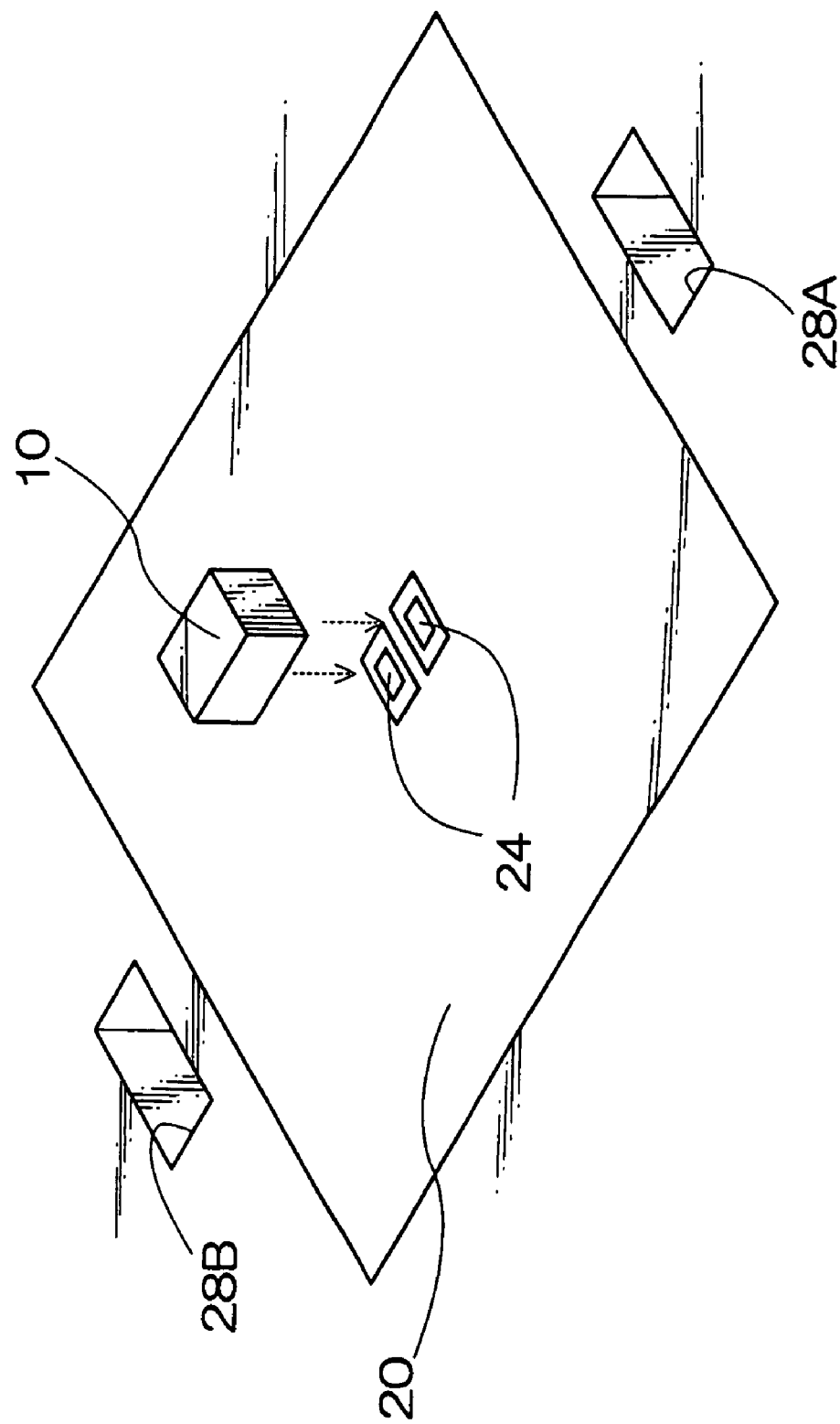
FIG. 3 is a perspective view showing a mounting structure of a chip LED on a circuit board.

The chip LED 10 which is a light source is surface-mountable, and emits white light at high intensity. The chip LED 10 has two electrode pads (not shown) provided thereto. As shown in FIG. 3, those electrode pads are joined with pads 24 provided on the mounting land 20 of the circuit board 18 with a conductive adhesive such as a soldering paste. Thus, the chip LED 10 is firmly fixed on the mounting land 20, and is electrically connected to the strobing circuit mounted on the circuit board 18. The pads 24 of the mounting land 20 are isolated from the gold plate. The method for mounting the chip LED 10 on the circuit board 18 is not limited to the above-mentioned case.

Figure 4:
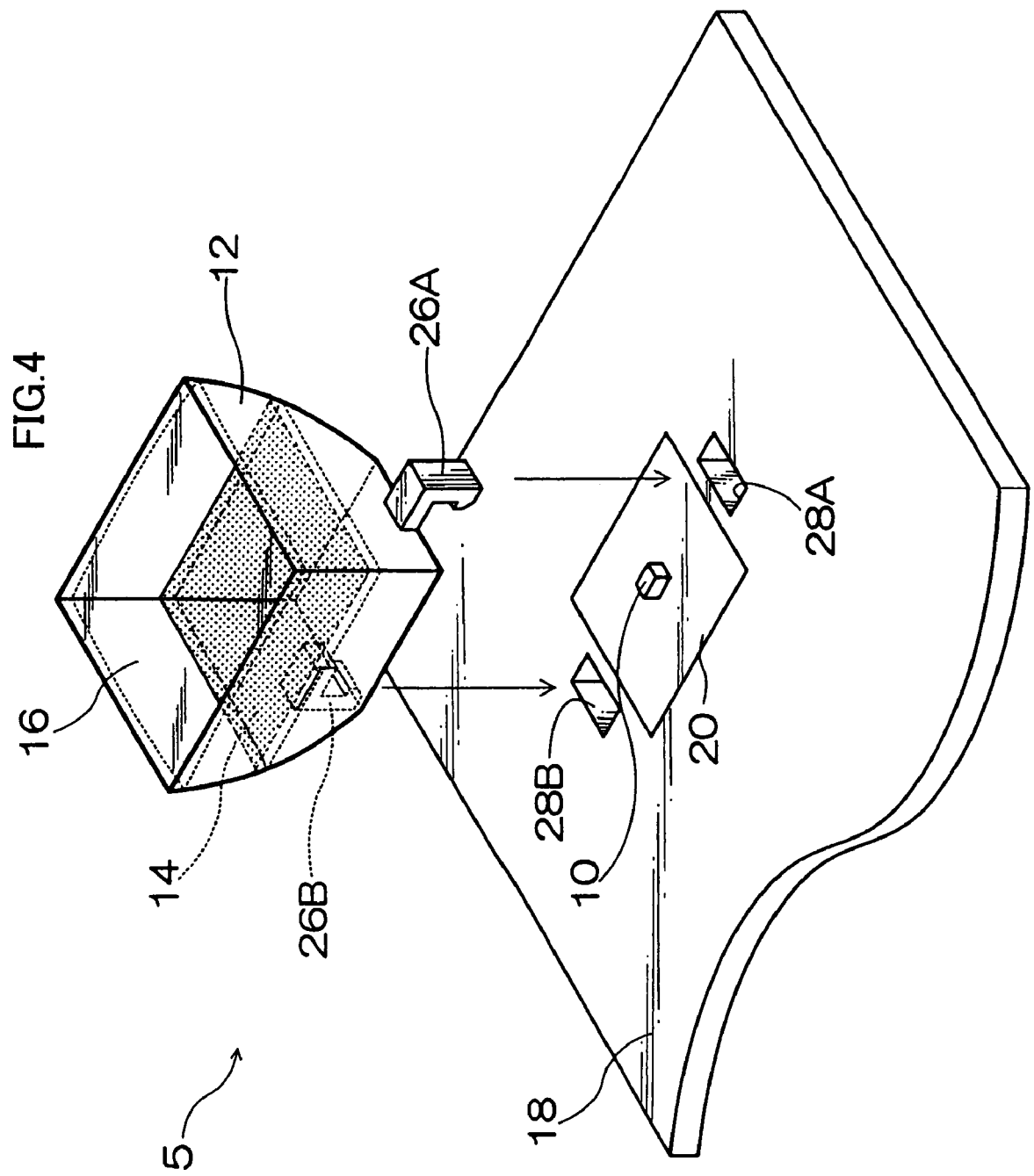
FIG. 4 is a perspective view showing a mounting structure of a reflector on the circuit board.

The reflector 12 is formed like a rectangular tube expanding toward its end. It is mounted on the circuit board 18 so as to surround the chip LED 10 firmly fixed on the mounting land 20 so as to reflect ahead the light emitted from the chip LED 10. As shown in FIG. 4, a pair of claws 26A and 26B is provided on the circumference of a base edge portion of the reflector 12. The reflector 12 is fixed on the circuit board 18 by fitting the claws 26A and 26B in mounting holes 28A and 28B formed on the circuit board 18.

The diffusion plate 14 is mounted in the reflector 12 to diffuse the light emitted from the chip LED 10 and also convert it into predetermined color temperature. The diffusion plate 14 is formed in accordance with a sectional shape of the reflector 12, and is fixed by being appressed to an internal wall of the reflector 12. Accordingly, all the light emitted from the chip LED 10 passes through the diffusion plate 14.

The concave lens 16 is mounted at the end of the reflector 12, and expands and floods ahead the light from the chip LED 10 emitted via the diffusion plate 14. The concave lens 16 is formed in accordance with the shape of the end opening of the reflector 12, and is mounted so as to block the end opening of the reflector 12.

The action of the electronic flash apparatus 5 of the present invention having the above-described configuration is as follows.

Figure 5:
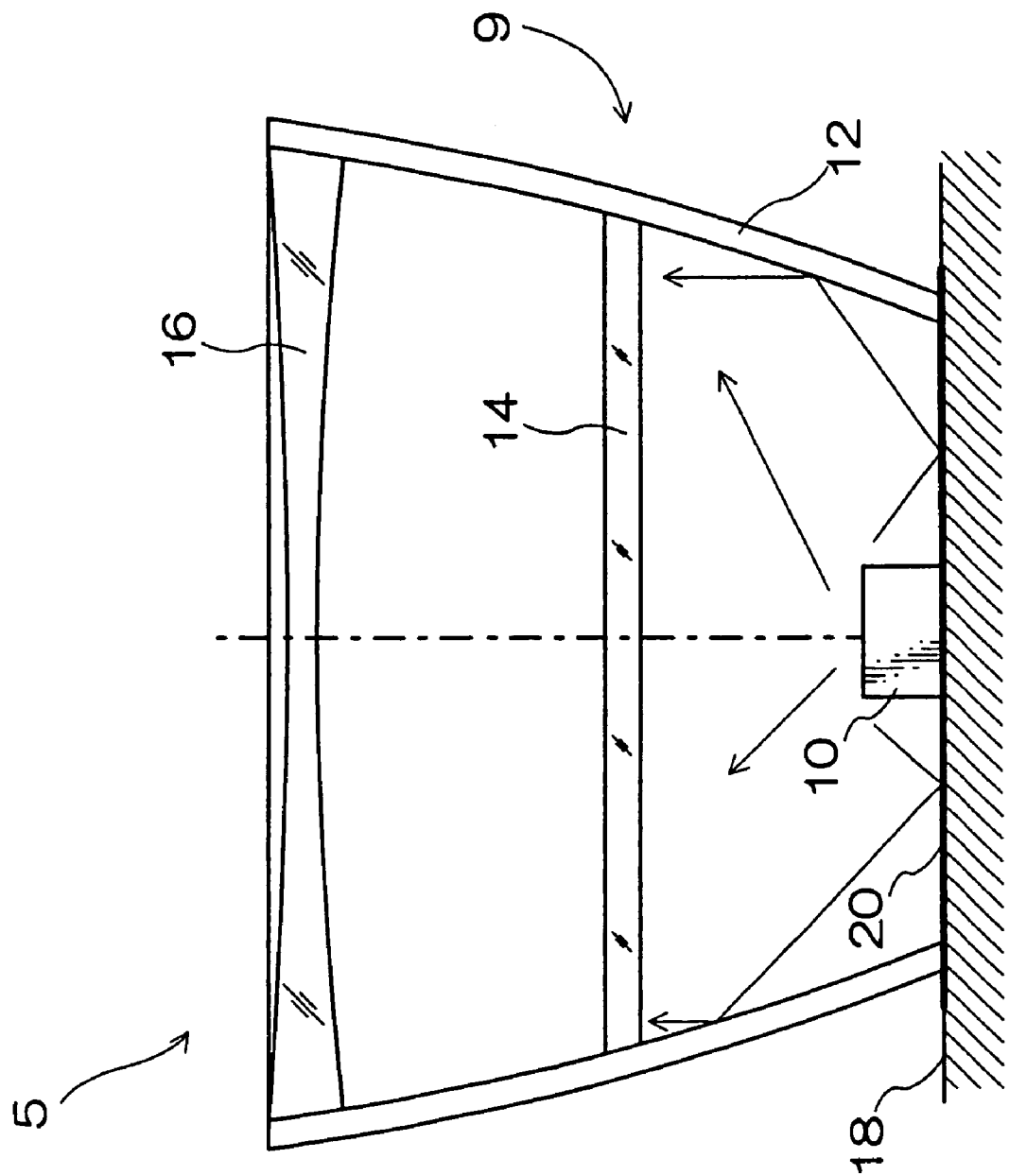
FIG. 5 is a longitudinal section showing configuration of the electronic flash apparatus according to the first embodiment.

As shown in FIG. 5, the light emitted from the LED (chip) of the chip LED 10 as the light source passes through the diffusion plate 14 first so as to be diffused and converted into predetermined color temperature. And the light source having passed through the diffusion plate 14 passes through the concave lens 16 so as to be radially expanded and flooded ahead. Thus, it is possible to irradiate in a wide range the light from the LED emitted as a point source and strongly oriented.

According to the electronic flash apparatus 5 of the present invention, the light emitted from the chip LED 10 in the side surface direction is reflected ahead by the reflector 12, and the light emitted from the chip LED 10 in the rear direction is reflected ahead by the gold plate affixed on the mounting land 20. Thus, it is possible to effectively utilize the light emitted from the chip LED 10 in the side surface direction and the rear direction as illumination light ahead.

It is also possible, by mounting the chip LED 10 and so on on the circuit board 18, to cut down on the number of components and reduce manufacturing cost.

According to this embodiment, one white light-emitting chip LED 10 is used as the light source of the electronic flash apparatus 5. It is also possible, however, to mount not only one but a plurality of white light-emitting chip LEDs on the mounting land 20 of the circuit board 18 and use them as the light sources.

Figure 6:
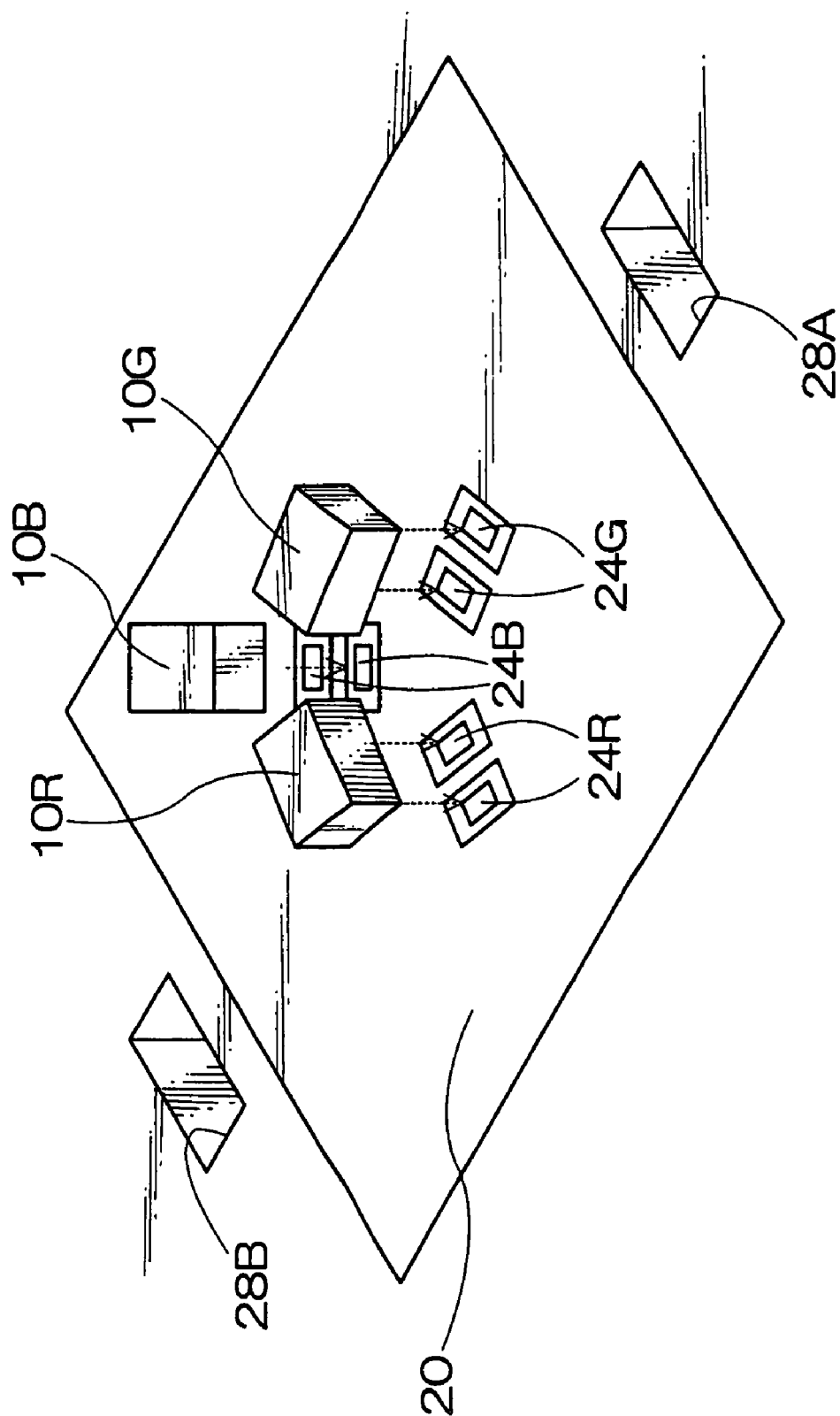
FIG. 6 is a perspective view showing a mounting structure of chip LEDs of three colors RGB on the circuit board.

It is also possible, instead of using the white light-emitting chip LED 10 as the light source of the electronic flash apparatus 5, to use the chip LEDs in different luminescent colors such as those for emitting red light, green light and blue light so as to radiate white illumination light by mixing the light in these colors. In this case, it is desirable, as shown in FIG. 6, to radially place chips 10R, 10G and 10B for emitting the red light, green light and blue light on the mounting land 20 of the circuit board 18. To be more specific, three pairs of pads 24R, 24G and 24B are radially provided on the mounting land 20 of the circuit board 18 as with the pair of pads 24 shown in FIG. 3, and the chip 10R for emitting the red light, the chip 10G for emitting the green light and the chip 10B for emitting the blue light are affixed to the pairs of pads 24R, 24G and 24B respectively. Thus, it is possible to efficiently mix the light emitted from the chips 10R, 10G and 10B.

The case of radiating the white illumination light was described in this embodiment. It is also possible, however, to radiate the illumination light in another color, and in that case, the chip LED of the luminescent color in accordance with that color may be used.

Furthermore, according to this embodiment, the gold plate is affixed on the surface of the mounting land 20 so as to reflect ahead the light emitted from the chip LED 10 in the rear direction. It is also possible, however, to form the surface of the mounting land 20 with a material other than the gold plate if it has the effect of reflecting the light.

According to this embodiment, the surface-mounted chip LED 10 is used as the light source of the electronic flash apparatus 5. However, the form of the LED to be used as the light source is not limited thereto, and it is also possible to use a LED lamp 10A having a lead terminal provided thereon instead of the chip LED 10.

Next, a description will be given as to configuration of a second embodiment of the electronic flash apparatus to which the present invention is applied to. The circuit board 18 in FIG. 7 showing this embodiment has the circuit components such as the strobing circuit mounted thereon as with the first embodiment, and the electronic flash apparatus 5 is mounted in a portion thereof.

Figure 7:
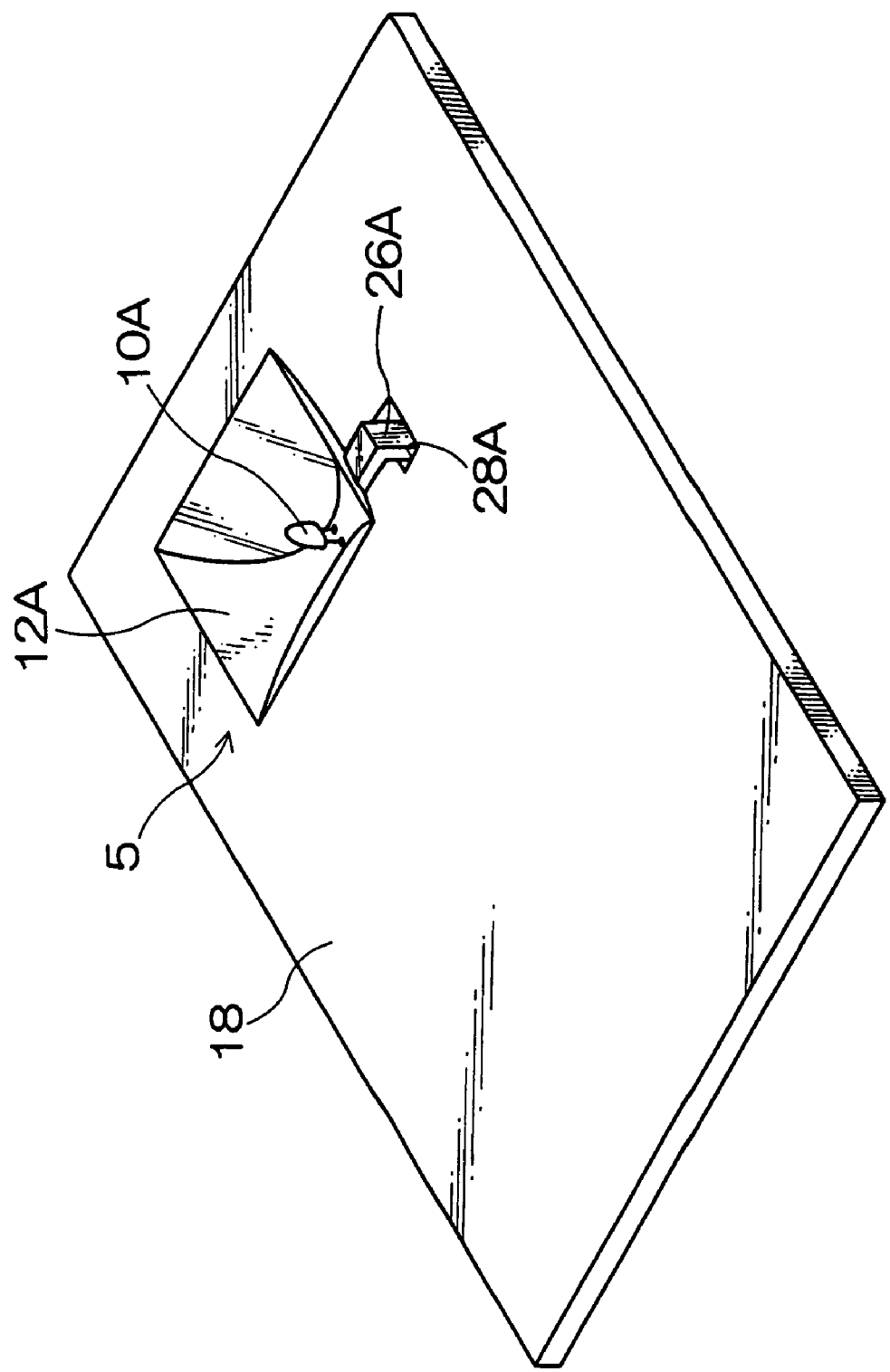
FIG. 7 is a perspective view showing a mounting structure of a LED lamp on the circuit board according to a second embodiment.

In FIG. 7, optical components such as the diffusion plate and concave lens shown in FIG. 2 are omitted. The electronic flash apparatus 5 has two lead terminals provided thereto, and is comprised of the LED lamp 10A for emitting the white light at high intensity and a reflector 12A opening only at the front. The reflector 12A can be mounted on the circuit board 18 by fitting the claws 26A and 26B (one of them is not shown) provided on the side surface thereof in mounting holes 28A and 28B on the circuit board 18 as with the first embodiment.

Figure 8:
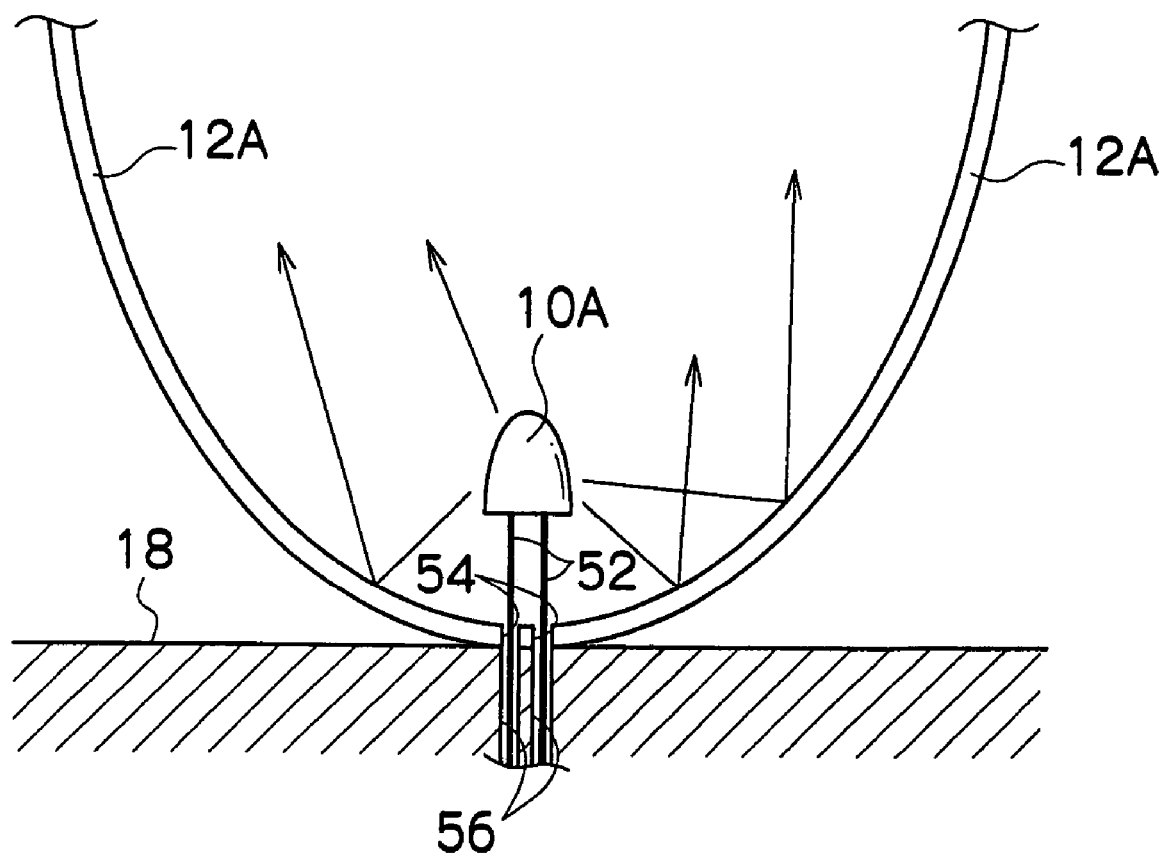
FIG. 8 is a sectional view showing the electronic flash apparatus in FIG. 7 from a side surface direction.

As shown in a side sectional view in FIG. 8, holes 54 and 56 penetrating two lead terminals 52 of the LED lamp 10A respectively are formed on the rear (bottom face) of the circuit board 18 and the reflector 12A. The two lead terminals 52 of the LED lamp 10A are inserted into the holes 54 and 56 and soldered on the rear of the circuit board 18 so that the LED lamp 10A is mounted on the circuit board 18 and is electrically connected to the strobing circuit.

As shown in FIG. 8, the LED lamp 10A is placed so that its bottom is clear of the bottom face of the reflector 12A. Thus, not only the light emitted from the LED lamp 10A in the side surface direction but also the light emitted in the rear direction is reflected ahead by an internal reflecting surface of the reflector 12A, and is effectively used as the illumination light.

It is also possible to change the configuration of the second embodiment as with the first embodiment. For instance, a plurality of LED lamps 10A may be used as the light source instead of one LED lamp 10A. It is also possible to radiate the white illumination light with the LED lamps for emitting the red light, green light and blue light. The illumination light may be in a color other than white, and in that case, the LED lamp of the luminescent color in accordance with that color should be used.

In the case of using the LED lamp as the light source in the first embodiment, it is possible to place the LED lamp so that its bottom is clear of the mounting land 20 as with the second embodiment.

FIG. 9 is a longitudinal section showing configuration of a third embodiment of the electronic flash apparatus according to the present invention.

As shown in FIG. 9, a electronic flash apparatus 30 according to this embodiment is equivalent to the electronic flash apparatus 5 in the above-mentioned first embodiment holding the concave lens 16 placed in front of the light source movable back and forth along an optical axis, which renders an irradiation angle of the light irradiated from the electronic flash apparatus variable. The same components as those of the electronic flash apparatus 5 in the above-mentioned embodiment will be given the same symbols, and a description thereof will be omitted.

As shown in FIG. 9, the concave lens 16 held by a lens frame 32 is placed in front of the light-emitting portion 9 comprised of the chip LED 10, reflector 12 and diffusion plate 14, and a transparent cover glass 34 is placed in front of it. The cover glass 34 is fitted into an exterior 2A of the camera body.

The lens frame 32 for holding the concave lens 16 has a guide portion 36 and a nut portion 38 integrally formed on its circumference.

The guide portion 36 has a guide hole 36A formed along an optical axis L of the concave lens 16, and a guide bar 40 placed along the optical axis L is inserted into the guide hole 36A. The guide bar 40 is fixed by an unshown frame placed in the camera body. And the guide portion 36 slides along the guide bar 40 so that the concave lens 16 moves back and forth along the optical axis L in front of the light-emitting portion 9.

The nut portion 38 has a screw hole 38A formed along the optical axis L of the concave lens 16, and a screw bar 42 placed along the optical axis L is screwed into the screw hole 38A. The screw bar 42 is linked to an output axis of a motor 44 placed in the camera body, and is rotated by driving the motor 44. And the nut portion 38 moves along the screw bar 42 as the screw bar 42 is rotated so that the concave lens 16 thereby moves back and forth along the optical axis L.

The motor 44 for rotatively driving the screw bar 42 has its drive controlled by a control portion (CPU) for centrally controlling the digital camera 1, and is driven in conjunction with zooming of the taking lens 3. To be more specific, the drive is controlled so that the irradiation angle of the light irradiated via the concave lens 16 changes according to a field angle of the taking lens 3.

According to the electronic flash apparatus 30 of this embodiment constituted as above, it is possible, by moving the concave lens 16 placed in front of the light-emitting portion 9 back and forth along the optical axis L, to change the irradiation angle of the light irradiated via the concave lens 16 according to the field angle of the taking lens 3. Thus, it is possible to effectively utilize the light irradiated from the chip LED 10 as the light source.

According to this embodiment, the light-emitting portion 9 is fixed and the concave lens 16 is moved back and forth to the light-emitting portion 9 which is fixed. However, it may be inverse. To be more specific, it is also possible to fix the concave lens 16 and move the light-emitting portion 9 back and forth to the concave lens 16 along the optical axis L of the concave lens 16.

The above-mentioned embodiment was described by taking an example in which the electronic flash apparatus according to the present invention is built into the digital camera. It is also possible, however, to use it for a silver salt camera using a film or apply it to a lighting apparatus for other uses.

This embodiment was also described by taking an example in which the electronic flash apparatus according to the present invention is built into the camera body. It is also possible, however, to independently constitute it (a so-called external electronic flash apparatus).

What is claimed is:

1. An electronic flash apparatus, comprising:
    a circuit board having a mounting land, the mounting land including a light reflecting area;
    a light-emitting portion having an LED light source for emitting illumination light with a light-emitting diode, the LED light source being mounted in the light reflecting area;
    a reflector for reflecting ahead the light emitted from the LED light source, the reflector which is mounted on the circuit board so as to surround the LED light source;
    an optical element for diffusing the light emitted from said LED light source; and
    a concave lens for changing irradiation angle of the light diffused by the optical element.

2. The electronic flash apparatus according to claim 1, wherein the optical element is placed between said LED light source and said concave lens.

3. The electronic flash apparatus according to claim 2, wherein said optical component also converts the light emitted from said LED light source into predetermined color temperature.

4. The electronic flash apparatus according to claim 1, further comprising:
    a movement device which relatively moves said light-emitting portion and said concave lens in an optical axis direction, and changes an irradiation angle of the light emitted from said concave lens by relatively moving said light-emitting portion and said concave lens in the optical axis direction with the movement device.

5. The electronic flash apparatus according to claim 2, further comprising:
    a movement device which relatively moves said light-emitting portion and said concave lens in an optical axis direction, and changes an irradiation angle of the light emitted from said concave lens by relatively moving said light-emitting portion and said concave lens in the optical axis direction with the movement device.

6. The electronic flash apparatus according to claim 3, further comprising:
    a movement device which relatively moves said light-emitting portion and said concave lens in an optical axis direction, and changes an irradiation angle of the light emitted from said concave lens by relatively moving said light-emitting portion and said concave lens in the optical axis direction with the movement device.

7. The lighting apparatus according to claim 1, wherein said LED light source is comprised of three types of LED light sources for emitting red light, green light and blue light, and the LED light source for emitting the light in each color is radially placed.

8. A camera, comprising:
    a camera body; and
    the electronic flash apparatus of claim 1 arranged in the camera body.

9. The electronic flash apparatus according to claim 1, further comprising:
    a circuit board,
    wherein the reflector is attached to a surface of the circuit board.

10. The camera according to claim 8, wherein said camera body includes a taking lens having an adjustable field angle, and
    wherein a position of said concave lens is adjusted along an optical axis direction according to the field angle of the taking lens.

11. The electronic flash apparatus according to claim 1, wherein the circuit board defines a mounting hole, and the reflector is provided with a claw extending from the reflector, and
    wherein the reflector is attached to the circuit board by engaging the claw with the mounting hole.

12. The electronic flash apparatus according to claim 1, wherein the reflector has an opening at a bottom portion thereof, such that the reflective surface is exposed through the opening when the reflector is attached to the circuit board.

13. The electronic flash apparatus according to claim 1, wherein the reflective plate is a gold plate.

14. The electronic flash apparatus according to claim 1, wherein the concave lens has a concaved portion on both sides thereof.

* * * * *